United States Patent
Robertson

(10) Patent No.: US 6,493,818 B2
(45) Date of Patent: Dec. 10, 2002

(54) TECHNIQUE FOR PIPELINING SYNCHRONIZATION TO MAINTAIN THROUGHPUT ACROSS TWO ASYNCHRONOUS CLOCK DOMAIN BOUNDARIES

(75) Inventor: Iain Robertson, Bedfordshire (GB)

(73) Assignee: Texas Instruments Incorporated, Dallas, TX (US)

( * ) Notice: Subject to any disclaimer, the term of this patent is extended or adjusted under 35 U.S.C. 154(b) by 145 days.

(21) Appl. No.: 09/733,590

(22) Filed: Dec. 8, 2000

(65) Prior Publication Data

US 2001/0042219 A1 Nov. 15, 2001

(30) Foreign Application Priority Data

Feb. 9, 2000 (EP) ............................................. 00301293

(51) Int. Cl.[7] .......................... G06F 15/82; G06F 13/38; G06F 13/14
(52) U.S. Cl. .......................... 712/27; 712/201; 712/219; 713/400; 711/169; 711/168
(58) Field of Search ................................. 712/219, 201, 712/245, 27, 23; 713/400; 710/61; 711/169, 168

(56) References Cited

U.S. PATENT DOCUMENTS

| 4,525,849 A | 7/1985 | Wolf |
| 4,805,198 A | 2/1989 | Stern et al. |
| 4,873,703 A | * 10/1989 | Crandall et al. ............ 713/400 |
| 6,128,715 A | * 10/2000 | Wang et al. ................ 711/168 |

FOREIGN PATENT DOCUMENTS

| EP | 1124179 A1 * | 8/2001 | ............. G06F/5/06 |

* cited by examiner

Primary Examiner—Daniel H. Pan
(74) Attorney, Agent, or Firm—Robert D. Marshall, Jr.; W. James Brady, III; Frederick J. Telecky, Jr.

(57) ABSTRACT

This invention is a data synchronous apparatus for synchronization between a first clock domain to a second clock domain asynchronous with the first clock domain. This invention provides for pipelining of data between the two clock domains. Plural synchronizer stages each include a data register (601, 602, 603, 604, 605) and a synchronizer circuit (611, 612, 613, 614, 615). The synchronizer circuit synchronizes a first domain write request signal to the second clock signal. A write pointer (625) enables one synchronizer stage to write first domain data upon receipt of said first domain write request signal (321). The write pointer thereafter increments to indicate a next synchronizer stage in a circular sequence. A read pointer (635) enables an indicated read stage to recall data from the corresponding data register upon output synchronization with the second clock signal. The read pointer thereafter increments to indicate the next synchronizer stage in the circular sequence. Plural first domain write request signals may simultaneously be in various states of synchronization with the second clock signal in corresponding ones of said synchronization stages.

5 Claims, 6 Drawing Sheets

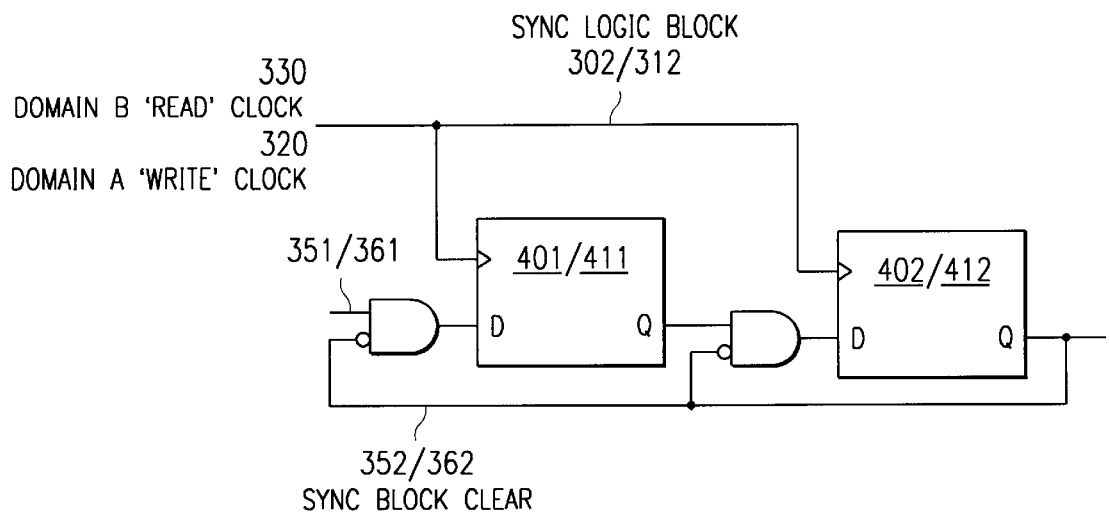
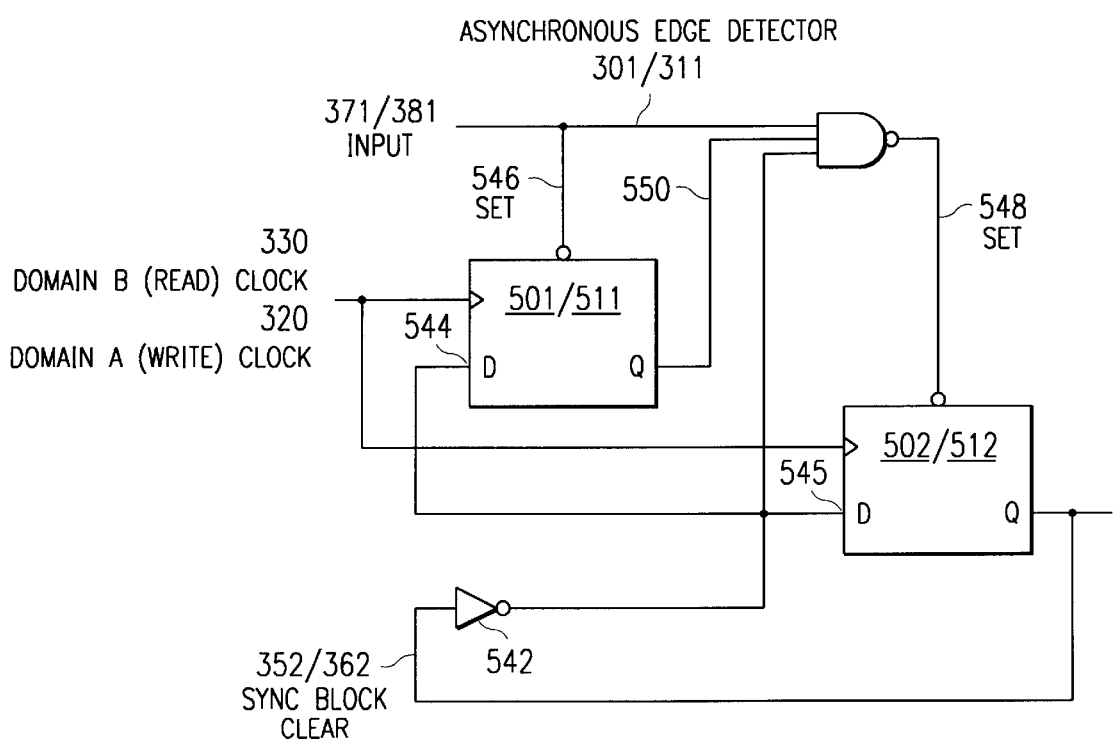

TECHNIQUE FOR PIPELINING SYNCHRONIZATION TO MAINTAIN THROUGHPUT ACROSS TWO ASYNCHRONOUS CLOCK DOMAIN BOUNDARIES

TECHNICAL FIELD OF THE INVENTION

The technical field of this invention is digital device functional blocks, used generally in the area of microprocessor design and more specifically in the area of digital signal processor devices.

BACKGROUND OF THE INVENTION

This invention is used by the TRANSFER CONTROLLER WITH HUB AND PORTS ARCHITECTURE of U.K. Patent Application No. 990919.6 filed Apr. 16, 1999. The transfer controller with hub and ports is a significant basic improvement in data transfer techniques in complex digital systems. This transfer controller allows for uniform implementation of port interfaces at the periphery of such systems. Some of these ports may be slow having a relatively low data throughput. Others may be relatively fast having the throughput and speed of the central processor unit. These two portions of the device are often driven by two separate clock signals. The first clock signal has a higher frequency called the core or main processor clock. The second clock signal is called the peripheral device clock.

Synchronization in the external ports interface is required for a high speed core device to interface with a relatively low speed peripheral device. Typical known art for synchronizing requests, data or any multi-bit quantity is to write the information into a register, and then synchronize a single signal into the other domain to indicate that the data is valid and stable. The data can then be read in the other clock domain. It is not desirable to synchronize all the bits of data individually. This may result in the data being corrupted. If the data is fed into synchronizers at the point at which the synchronizers sample the data, some of the data may be sampled on this cycle and some may be sampled a cycle later. When any generalized clock frequency relationship is allowed, it is also necessary to synchronize in both directions.

SUMMARY OF THE INVENTION

This invention is a data synchronous apparatus for synchronization between a first clock domain to a second clock domain asynchronous with the first clock domain. This invention is applicable generally to any digital device using two clocks in separate portions of the device. It is particularly useful for data transfers between a relatively high speed and a relatively low speed. Usually the high speed portion is the processor core and the relatively low speed portion is the input/output (I/O) devices.

This invention provides for pipelining of data between two clock domains with asynchronous clock signals. This invention uses a shallow circular first-in-first-out (FIFO) memory element with all words passed to and from a given stage under direction of pipelined synchronized control signals. This invention includes plural synchronizer stages. Each synchronizer stage includes a data register and a synchronizer circuit. The synchronizer circuit receives a first domain write request signal and supplies a second domain read ready signal responsive to the first domain write request signal and synchronous with second clock signal. A write pointer stores an indication of one of the synchronizer stages as a write stage. This write pointer enables the indicated write synchronizer stage to write first domain data to the corresponding data register upon receipt of said first domain write request signal. The write pointer thereafter increments to indicate a next synchronizer stage in a circular sequence. a read pointer stores an indication of one of the synchronizer stages as a read stage. The read pointer enables the indicated read stage to recall second domain data from the corresponding data register upon output of a corresponding second domain read ready signal in synchronization with the second clock signal. The read pointer thereafter increments to indicate the next synchronizer stage in the circular sequence. A multiplexer selects output data from the data register indicated by the read pointer. Thus plural first domain write request signals may simultaneously be in various states of synchronization with the second clock signal in corresponding ones of said synchronization stages.

BRIEF DESCRIPTION OF THE DRAWINGS

These and other aspects of this invention are illustrated in the drawings, in which:

FIG. 4 illustrates the gate level logic diagram of the synchronizer logic block of FIG. 3;

FIG. 5 illustrates the gate level logic diagram of the asynchronous edge detector block of FIG. 3;

DETAILED DESCRIPTION OF PREFERRED EMBODIMENTS

This invention presents techniques that allow the following signals to be passed between a transfer controller hub and its external ports: requests/write data sent from the hub to the ports; and read data sent from the ports to the hub. In either case a solution permitting a totally arbitrary frequency relationship between the hub clock and port clock is indispensable. In normal operation there is usually at least a somewhat restricted frequency relationship between these two clocks. However, the invention provides for the possibility that some applications may want to slow a port down, potentially by any amount. Additionally in-circuit emulation during which the hub may operate at a very low frequency while connected to ports operating at normal speed is anticipated.

Applying the design philosophy common to the development of the transfer controller with hub and ports architecture, the intent of this invention is to ensure that hub bandwidth is never wasted. Because of this, it is important to allow the request queue to fill in a port at the maximum possible hub rate, even if it could only be emptied much more slowly by the port. In this way, an initial burst of requests generated at the beginning of process is expected, followed subsequently by request generation at the rate at which the port normally processes the requests. This ensures that hub bandwidth for other lower priority requests is made available as early as possible in a period of operation. The important result is that the hub generates requests at the rate of one per cycle, and has synchronizers that transfer them into ports able to adequately meet the demand for broadcasting these read/write commands at an acceptable rate.

Figure 1:
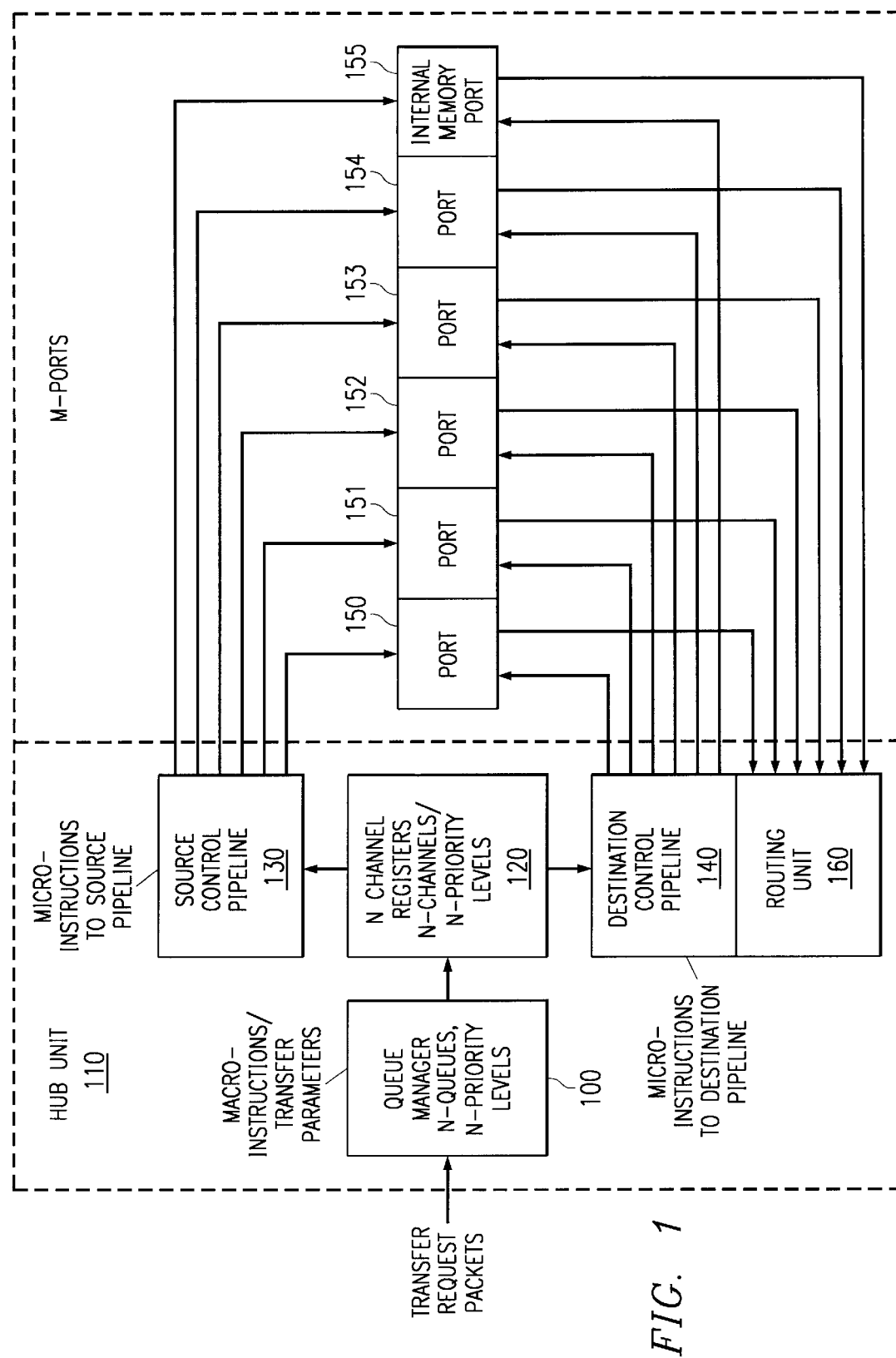
FIG. 1 illustrates a block diagram of the basic principal features of a transfer controller with hub and ports architecture to which this invention is useful.

FIG. 1 illustrates a block diagram of the principal features of the transfer controller with hub and ports. The transfer controller with hub and ports is basically a data transfer controller which has at its front end portion a request queue manager 100 receiving, prioritizing, and dispatching data in the form of transfer request packets. The request queue manager 100 connects within the hub unit 110 to the channel registers 120 which receive the data transfer request packets and processes them first by prioritizing them and assigning them to one of the N channels each of which represent a priority level. These channel registers interface with the source control pipeline 130 and destination control pipeline 140 which effectively are address calculation units for source (read) and destination (write) operations.

Outputs from these pipelines are broadcast to M ports. Six such ports 150 through 155 are illustrated in FIG. 1. These are clocked either at the main processor clock frequency or at a lower external device clock frequency. Read data from one port, e.g. port 150, having a destination write address of port 153 is returned to the hub destination control pipeline 140 through routing unit 160.

Each port may be divided into two sections. The application specific design is referred to as the application unit or AU. This may be a host port interface (HPI) or an external memory interface (EMIF). Between the application unit and the hub is the module known as a hub interface unit or HIU.

The hub interface unit serves several functions. The hub interface unit institutes an amount of buffering for read and write data to support write driven processing. The hub interface unit prioritizes read and write commands from source control pipeline 130 and destination control pipeline 140 of the transfer controller such that the port sees a single interface with both access types consolidated. A final function of the hub interface unit is to decouple the external port interface clock domain from the core processor clock domain.

Figure 2:
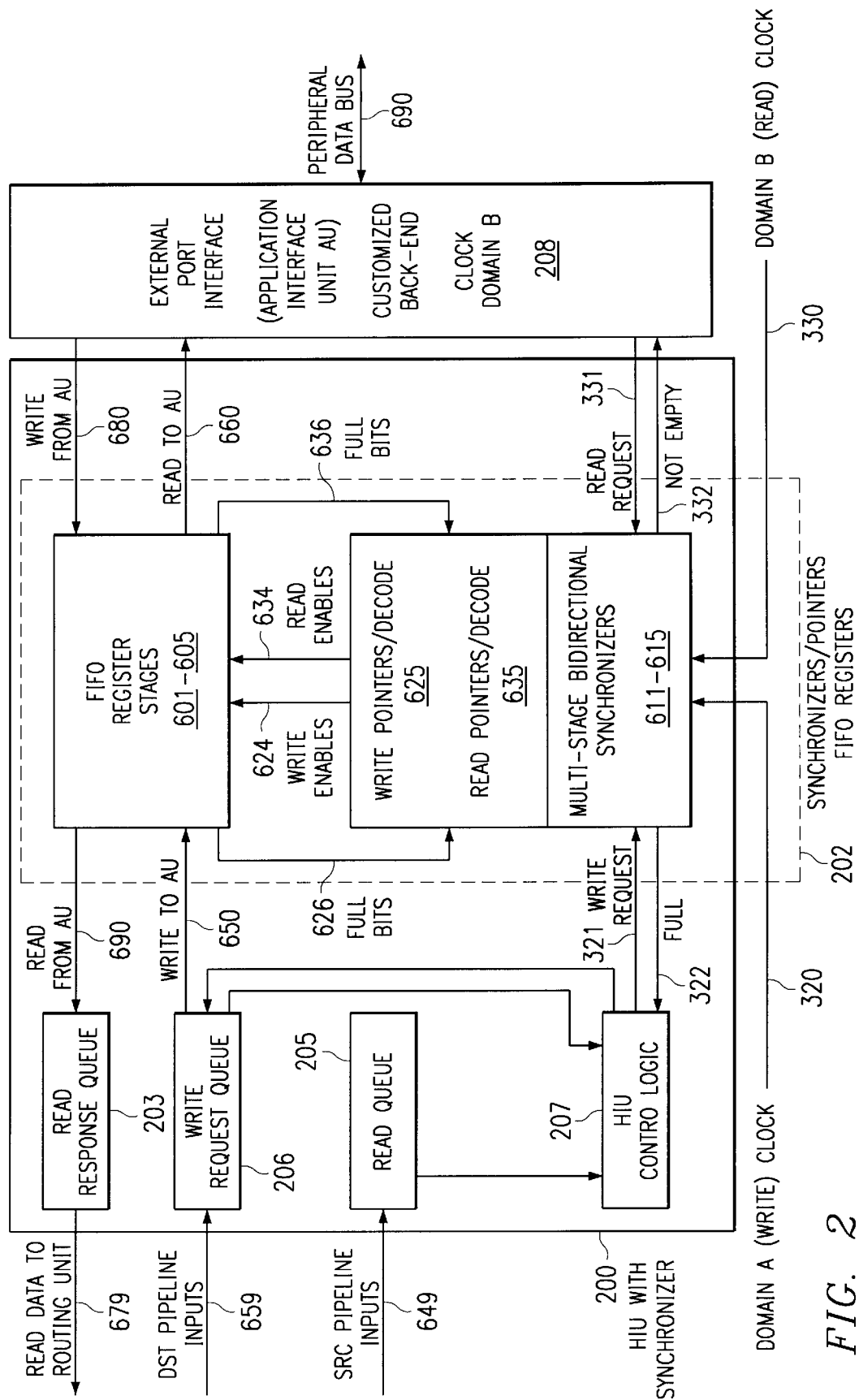
FIG. 2 illustrates the basic connections of the hub interface unit with synchronizer and the applications unit at one of the ports.

FIG. 2 illustrates a high level block diagram of an hub interface unit with synchronizers 200, including pointers 625 and 626 and FIFO register stages 601 to 605 and its interface to an application unit 208. The core functional blocks of the hub interface unit include the hub interface unit control logic 207, hub interface unit read queue 205, hub interface unit write request queue 206 and hub interface unit response queue 203. The source control pipeline inputs 649 and the destination control pipeline inputs 659 are sent from hub unit 110 to read queue 205 and write request queue 206 of the hub interface unit, respectively. The hub interface unit control logic 207 processes these words which contain commands, addresses and write data. The hub interface unit generates command signals, such as write request signal 621 for example, which are sent to synchronizers 220. The hub interface unit also generates status signals, such as not empty signal 632 for example, which are sent to the application unit along with write data 660. For read operations the application unit passes its data 690 to the hub interface unit.

These core functional blocks of the hub interface unit pass data 650, which comes from destination control pipeline 140, through the hub interface unit FIFO register stages 601 to 605 to write data 660 and thence to application unit 208. Similarly read data 690 returning from the application unit 208 is passed through the hub interface unit FIFO register stages 601 to 605 to the hub interface unit read response queue 203 as read data 680. It is then passes as read data to routing unit 679. Note that two instantiations of the logic illustrated in FIG. 6 (described below) are included in FIFO register stages 601 to 605 of FIG. 2. The first carries data from the hub interface unit to the application unit as write data 650 and write data 660. The second carries data from the application unit back to the hub interface unit as read data 690 and read data 680.

In the preferred embodiment of this invention, the hub interface unit operates within a clock domain a, the main processor clock. The application unit operates within a clock domain B, the application unit clock. Clock a is normally a higher frequency clock than clock B, but this is not necessarily the case. In any case, the proper operation of these two functional units in two separate clock domains requires the synchronizer block 202. This synchronization is the subject of this invention.

Regarding synchronization delay consider the following. Note that a signal in clock domain a can be synchronized into clock domain B by passing it through two flip flops in domain B. This is explained further later with reference to FIG. 4. Depending on the phase relationship between the two domains, it will take between a fraction greater than one B clock cycles and a fraction less than two B clock cycles for the domain a signal to be recognized in domain B. Furthermore, the domain a signal must be the output of a domain a flip flop. If it were the output of combinational logic instead, transition states of the signal as it was being evaluated could be sampled into domain B and interpreted as the valid state of the signal. The domain a signal must be valid for long enough to ensure it is captured by a domain B clock edge. Thus it typically takes three flip flops, and in the worst case one a clock cycle plus two B clock cycles to pass a signal between domains. Let this required time be labeled as T. If the interval between the events in domain a being synchronized is somewhat greater than T, then a generic FIFO with simple input-ready and output-ready controls could be used.

A more general solution, without restrictions on T is realized by this invention through the use of a circular FIFO. The basic operations of the synchronizer task may be first stated as follows. Domain a indicates to domain B that it has data ready for transfer. Domain B replies to domain a when it has received the data, so that domain a can send additional data.

Figure 3:
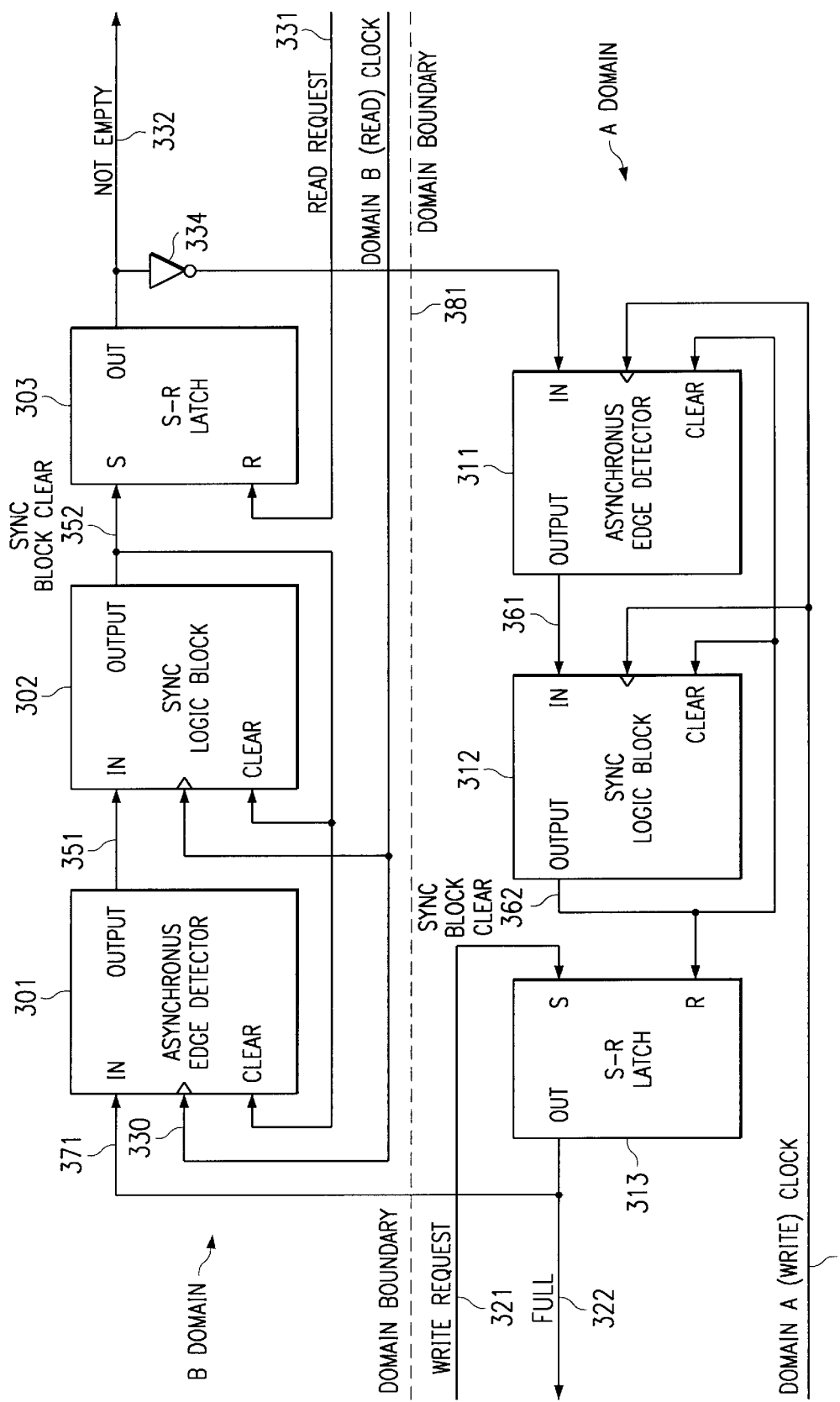
FIG. 3 illustrates the connection of the functional building blocks of one stage of the bi-directional synchronizer of this invention.

FIG. 3 shows this arrangement for one stage of such a bi-directional synchronizer that serves to provide synchronized clock and control to the accompanying FIFO stage. Each stage of the bi-directional synchronizer is accompanied by a FIFO stage as will be shown later. In FIG. 3, the bottom portion of the figure contains domain a. The domain a write clock 320 operates to write data into the input of the accompanying FIFO stage. The top portion of FIG. 3 contains domain B. The domain B read clock 330 operates to read data from the output of the accompanying FIFO stage.

The write request signal 321 goes active to request a write into the synchronizer datapath FIFO register stages 601 to 605. If the full signal 322 goes active this write request is denied. The FIFO is full, prohibiting an immediate write operation.

Similarly the read request signal 331 goes active to request a read from the synchronizer datapath FIFO register stages 601 to 605. If the not empty signal 332 goes active this read request is accepted. The not empty signal 332 indicates that there is additional valid read data in the FIFO.

FIG. 4 illustrates in detail synchronization logic blocks 302 and 312 of FIG. 3. In synchronization logic block 302, domain B read clock 330 is supplied to two flip flops 401 and 402. Assume that flip flops 401 and 402 are in a high state as a result of a previous entry of data at this FIFO stage. Then flip flops 401 and 402 will synchronously clear upon the next domain B read clock 330.

Referring back to FIG. 3, after the asynchronous edge detector 301 detects a new write entry signal, its output goes high. Thus the input to synchronization logic block 302 again goes high. This results in flip flops 401 and 402 capturing the high after an additional two domain B read clock signals 330. The result is that synchronization logic block 302, acting upon a write entry signal initiated in domain a, synchronizes it to the read operations of domain B.

FIG. 4 also illustrates in detail synchronization logic block 312 of domain a. In synchronization logic block 312 write clock 320 is supplied to two flip flops 411 and 412. Assume that flip flops 411 and 412 are in a high state as a result of a previous read of data at this FIFO stage. Then flip flops 411 and 412 will synchronously clear upon the next domain a clock signal 320.

Referring back to FIG. 3, after asynchronous edge detector 311 detects a new read entry signal, its output goes high. Thus the input to synchronization logic block 312 again goes high. This results in flip flops 411 and 412 capturing the high after an additional two domain a write clock signals 320. The result is that synchronization logic block 312, acting upon a read entry signal initiated in domain B, synchronizes it to the write operations of domain a.

FIG. 5 illustrates details of the construction of asynchronous edge detector 301 and 311 illustrated in FIG. 3. Referring to FIG. 5, in asynchronous edge detector 301 of domain B, the domain B read 330 clock is supplied to two flip flops 501 and 502. The synchronization block clear signal 352 to these flip flops is synchronous and active high. Thus when input signal 371 is high and with the inverter 542 between synchronization block clear signal 352 and the D inputs 544 and 545 of respective flip flops 501 and 502, the Q outputs of both flip flops 501 and 502 will go low on the rising edge of domain B read clock 330. The active low set inputs 546 and 548 of respective flip flops 501 and 502 are asynchronous. When these set inputs 546 and 548 go low, the respective Q outputs 550 and 552 of flip flops 501 and 502 will go high.

Asynchronous edge detector 301 performs the following sequence. Synchronous block clear signal 352 from the synchronous logic block 302 going high drives inputs 544 and 545 low via inverter 542. After one domain B read clock signal 330 positive edge the Q outputs of both flip flops 501 and 502 will be driven low. Then input signal 371 going low for a short time interval of perhaps a few nanoseconds will asynchronously set flip flop 501 high immediately. When input signal 371 returns to the high state, flip flop 502 will be asynchronously set high. Flip flop 502 going high indicates that the input signal 371 is now high and was low. Asynchronous edge detector 301 has thus detected a rising edge.

Similarly, in asynchronous edge detector 311 of domain a, the domain a write 320 clock is supplied to two flip flops 511 and 512. The synchronization block clear signal 362 to these flip flops is synchronous and active high. Thus when input signal 381 is high and with the inverter 542 between synchronization block clear signal 362 and the D inputs 544 and 545 of respective flip flops 511 and 512, the Q outputs of both flip flops 511 and 512 will go low on the rising edge of domain a write clock 320. The active low set inputs 546 and 548 of respective flip flops 511 and 512 are asynchronous. When these set inputs 546 and 548 go low, the respective Q outputs 550 and 562 of flip flops 511 and 512 will go high.

Asynchronous edge detector 311 performs the following sequence. Synchronous block clear signal 362 from the synchronous logic block 312 going high drives inputs 544 and 545 low via inverter 542. After one domain a write clock signal 320 positive edge the Q outputs of both flip flops 511 and 512 will be driven low. Then input signal 381 going low for a short time interval of perhaps a few nanoseconds will asynchronously set flip flop 511 high immediately. When input signal 381 returns to the high state, flip flop 512 will be asynchronously set high. Flip flop 512 going high indicates that the input signal 381 is now high and was low. Asynchronous edge detector 311 has thus detected a rising edge.

Figure 6:
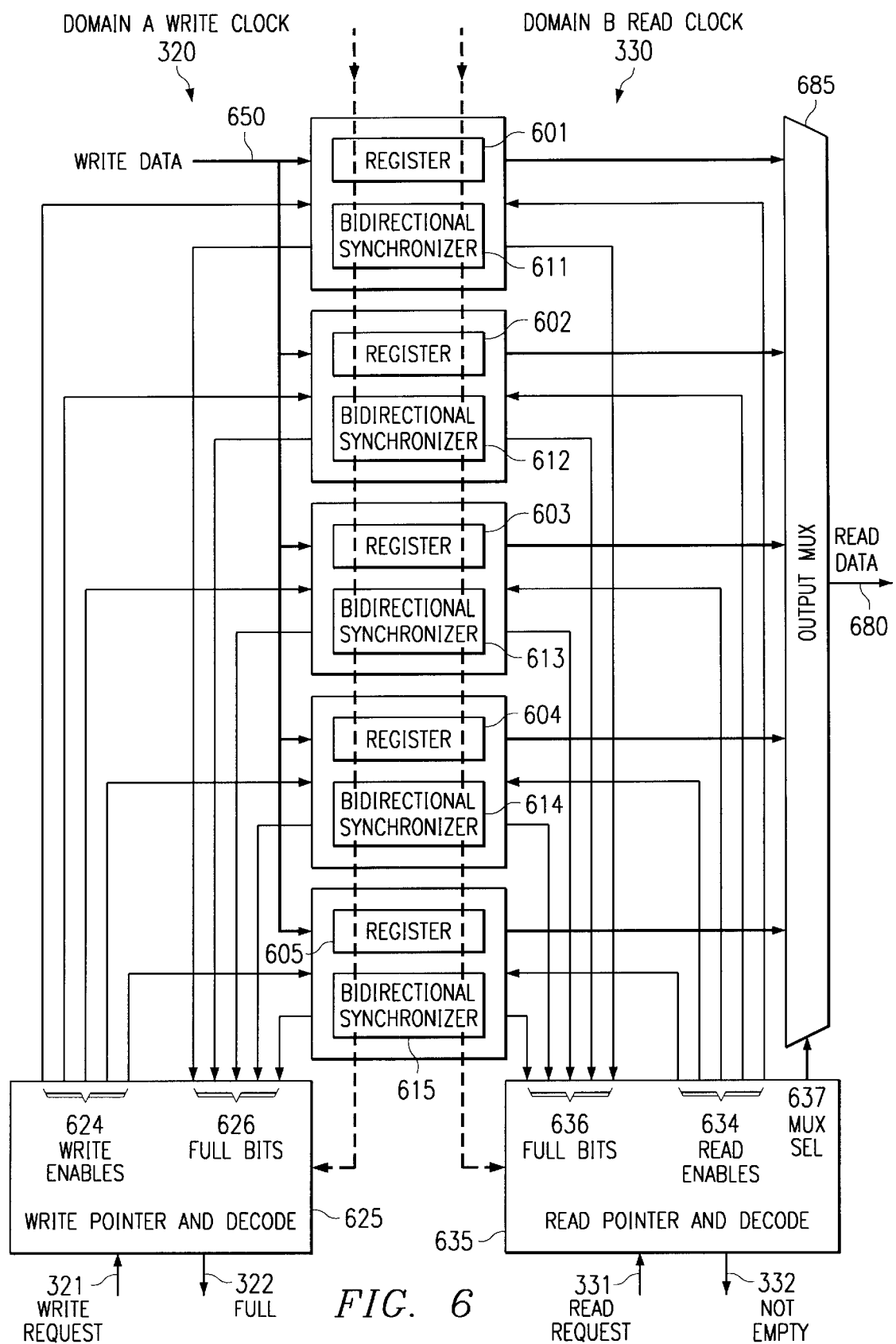
FIG. 6 illustrates the functional block diagram of the multi-stage pipelined synchronizer of this invention, showing the bi-directional synchronizer stages, the FIFO datapath registers, the pointer/decode logic, and the flow of clock and control signals in the multi-stage pipelined synchronizer.

FIG. 6 illustrates FIFO register stages 601 to 605, multistage bidirectional synchronizers 611 to 615, write pointer/decode 625 and read pointer/decode 626 of synchronizers/pointers FIFO registers 202 of FIG. 2. The FIFO registers stages are labeled 601, 602, 603, 604, and 605. The bi-directional synchronizer blocks 611, 612, 613, 614 and 615 contain all the logic described in FIGS. 3, 4 and 5. The read request signal 331, not empty signal 332, write request signal 321, and full signal 322 pass control information in both directions which control writing data at an individual FIFO stage or reading data from the FIFO depending on the state of these signals, and the write and read pointers.

Writes proceed from stage 601 through stage 605 in ascending order and then resume at 601. Thus the FIFO write pointer/decode 625 directs circular FIFO action. Similarly reads proceed from stage 601 through 605 in ascending order and then resume at stage 601. Thus the FIFO read pointer/decode 635 also directs circular FIFO read action.

Synchronizer action assures that writes may occur only at the register stage receiving an active write enable signal 624 input to that stage. The active stage must also be empty either due to no previous entry or because the last entry at that stage has been read as indicated by the corresponding full signal 626. Write data 650 is supplied to all register stages in parallel, but only one register stage is selected for writing by write enable signals 624. Similarly, synchronizer action assures that reads may occur only from a register stage receiving an active read enable signal 634 input to that stage. The active register stage has previously received an entry. Read data 680 is selected for output by multiplexer 685 according to the multiplexer select signal 637 will corresponds to the read pointer.

Note that two instantiations of the logic illustrated in FIG. 6 are included in the each FIFO register stage 601 to 605 of FIG. 2. The first carries write data from the hub interface unit to the application unit via write data 650 and write data 660. The second carries read data from the application unit back to the hub interface unit via read data 690 and read data 680.

Figure 7:
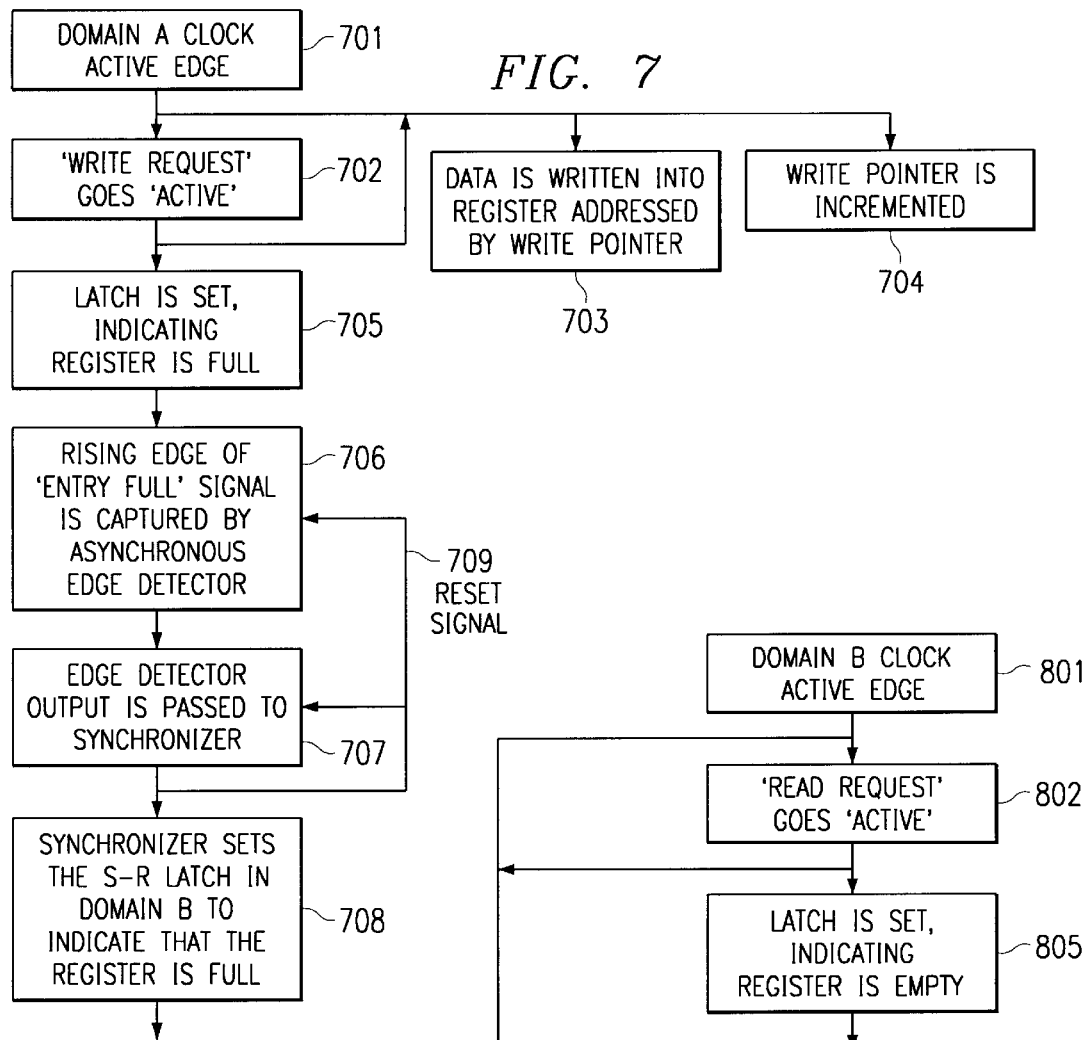
FIG. 7 illustrates the flow diagram of the principle of the multi-stage pipelined synchronizer of this invention with emphasis first on the write cycle, providing for a synchronized read after a completed write operation.

FIG. 7 illustrates the principle of synchronizer action in flow chart form. A write operation from a hub interface to an application unit is as follows. Write request signal 321 goes active (block 701) on a domain a write clock signal 320 active edge (block 702). Data is written into a FIFO register state 601 to 605 (block 703) using the domain a write clock and the write request signal, which is valid for one cycle. The write pointer 625 is incremented (block 704). This sets a set-reset latch 313 indicating the register is full via full signal 322 (block 705). The rising edge of full signal 322 is captured by asynchronous edge detector 301 (block 706). The output of asynchronous edge detector 301 is passed to synchronization logic block 302 (block 707). The output of synchronization logic block 302 sets set-reset latch 303 in Domain B indicating that the register is full via not empty signal (block 708). The output of synchronization logic block 302 resets asynchronous edge detector 301 and synchronization logic block 302 (block 709). This ensures that the synchronizer output is high for only one cycle.

Figure 8:
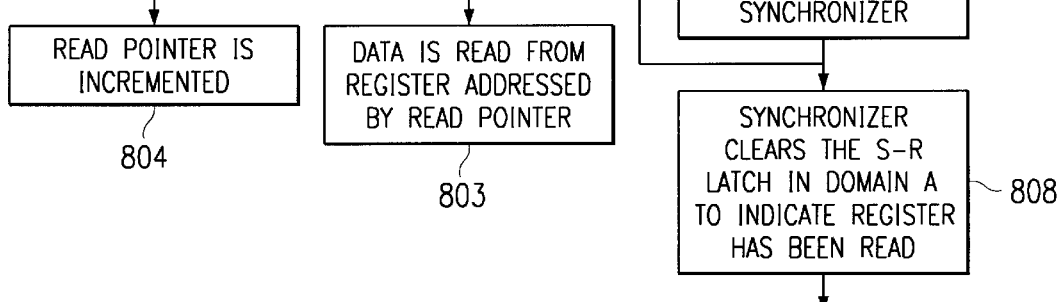
FIG. 8 illustrates a flow diagram of the multi-stage pipelined synchronizer of this invention with emphasis first on the read cycle, providing for a synchronized write after a completed read operation.

FIG. 8 illustrates an exactly equivalent process in the opposite direction. FIG. 8 illustrates a read operation from the application unit to the hub interface unit. Read request signal 331 goes active (block 801) on a domain B read clock signal 330 active edge (block 802). Data is read from a FIFO register state 601 to 605 (block 803) using the domain B read clock 330 and the read request signal, which is valid for one cycle. The read pointer 635 is incremented (block 804). This resets a set-reset latch 303 indicating the register is full via not empty signal 332 (block 805). The falling edge of not empty signal 332 supplied by inverter 334 is captured by asynchronous edge detector 311 (block 806). The output of asynchronous edge detector 311 is passed to synchronization logic block 312 (block 807). The output of synchronization logic block 312 clears set-reset latch 313 in Domain a indicating that the register is not full via full signal 322 (block 808). The output of synchronization logic block 322 resets asynchronous edge detector 311 and synchronization logic block 322 (block 809). This ensures that the synchronizer output is high for only one cycle.

The set-reset latches 303 and 313 shown could, in another embodiment, be replaced by triggered flip flops with the set and clear terms taken into account in the logic controlling the D input.

The novelty in the invention comes from replicating the contents of FIG. 6 each stage having a bi-directional synchronizer and an associated FIFO register stage multiple times. This pipelines the synchronization processes enabling plural signals to be in various stages of synchronization. Thus new data can be synchronized every cycle, even though the synchronization delay is much larger than this. Write pointer 625 and read pointer 636 are used to determine which register/synchronizer combination is to be used on any given cycle. These are implemented as straightforward incrementers, which wrap back to zero after the highest numbered register/synchronizer combination has been accessed. Write pointer 625 increments in domain a each time an entry is written. Thus, on the following cycle, the value of the full latch for the next entry determines whether that next entry can be written. Similarly, read pointer 635 increments in domain B each time an entry is removed. This in total can be viewed as a circular FIFO.

The number of needed entries in the FIFO will depend on a number of factors. If there are genuinely no restrictions on the clock relationships, then the condition which determines the number of entries required will be when the slave domain (domain B in this case) is operating at the same frequency as the master domain (domain a in this example). If domain a is capable of writing a new entry every cycle, and domain B is capable of reading a new entry every cycle, then the number of entries is determined by the maximum time taken between when the set-reset latch 313 in domain a is set and when it is subsequently cleared. If this is N domain a cycles, then there must be at least N entries in the FIFO in order that domain a shall be able to write a new entry every cycle indefinitely. Less than N will mean that when the write pointer cycles around to an entry, that entry will not yet have been marked empty following the previous write to it, and so domain a will have to stall. In general, the round trip time is comprised of a mixture of domain a and domain B cycles and must be rounded up to the next whole number of domain a cycles.

Depending on the requirements of the application, the number of entries required might be less than the number described above. For example, if domain B is always slower than domain a, or if domain B cannot read an entry every cycle, then fewer entries can be used without affecting the system performance. Domain a would have to stall anyway even if the synchronizer depth were greater.

An alternative application is a replacement for a dribble down buffer in a networking device. In this case, data arrives every cycle for some maximum length of time, followed by a pause. An example id an Ethernet frame, followed by an inter-frame gap. In this case, domains a and B will typically have the same nominal frequency, but with an allowed small tolerance, such as +1% deviation. If domain B is slower than domain a, then over the duration of a frame, the FIFO will become more full. In this case, the number of entries must be sufficient to ensure the FIFO doesn't fill completely by the end of a maximum sized frame with worst case tolerance. The gap between frames will then be used to restore the balance. Effectively, the gap in domain B would be slightly less than in domain a.

What is claimed is:

1. An apparatus for synchronization of a signal in a first clock domain to a second clock domain asynchronous with said first clock domain, said apparatus comprising:

a plurality of synchronizer stages, each synchronizer stage having a first clock input receiving a first clock signal of said first clock domain, a second clock input receiving a second clock signal of said second clock domain, a first domain input for receiving a first domain input signal synchronous with said first clock signal and a second domain output supplying a second domain output signal responsive to said first domain input signal and synchronous with second clock signal;

a write pointer storing therein an indication of one of said plurality of synchronizer stages as a write stage, said write pointer enabling said one of said plurality of synchronizer stages to input a first domain input signal upon receipt of said first domain input signal and thereafter incrementing said stored indication of said write stage to indicate a next synchronizer stage in a circular sequence of said plurality of synchronizer stages; and a read pointer storing therein an indication of one of said plurality of synchronizer stages as a read stage, said read pointer enabling said one of said synchronizer stages to output said second domain output signal upon synchronization with said second clock signal and thereafter incrementing said stored indication of said read stage to indicate said next synchronizer stage in said circular sequence of said plurality of synchronizer stages;

whereby plural first domain input signals may simultaneously be in various states of synchronization with said second clock signal in corresponding ones of said synchronization stages.

2. A data transfer apparatus for transfer of data from a first clock domain to a second clock domain asynchronous with said first clock domain, said data transfer apparatus comprising:

a plurality of synchronizer stages, each synchronizer stage including a first clock input receiving a first clock signal of said first clock domain, a second clock input receiving a second clock signal of said second clock domain, each synchronizer stage having a data register having a data input receiving first clock domain data synchronized with said first clock signal and storing said first clock domain data therein, and a data output for recalling data therefrom synchronized with said second clock signal, a synchronizer circuit having a first domain input for receiving a first domain write request signal synchronous with said first clock signal and a second domain output supplying a second domain read ready signal responsive to said first domain write request signal and synchronous with second clock signal;

a write pointer storing therein an indication of one of said plurality of synchronizer stages as a write stage, said write pointer enabling said one of said plurality of synchronizer stages to write first domain data to said data storage upon receipt of said first domain write request signal and thereafter incrementing said stored indication of said write stage to indicate a next synchronizer stage in a circular sequence of said plurality of synchronizer stages;

a read pointer storing therein an indication of one of said plurality of synchronizer stages as a read stage, said read pointer enabling said one of said synchronizer stages to recall said second domain data from said data storage upon output of a corresponding second domain read ready signal in synchronization with said second clock signal and thereafter incrementing said stored indication of said read stage to indicate said next synchronizer stage in said circular sequence of said plurality of synchronizer stages; and a multiplexer connected to said read pointer and having a plurality of inputs each connected to said data output of a corresponding one of said plurality of synchronizer stages and a data output, said multiplexer selecting at said data output data from one of said plurality of inputs corresponding to said stored indication of said read pointer;

whereby plural first domain write request signals may simultaneously be in various states of synchronization with said second clock signal in corresponding ones of said synchronization stages.

3. The data transfer apparatus of claim 2, wherein:

said synchronizer circuit of each of said synchronizer stages includes a full-signal set-reset flip flop having a set input receiving said first domain write request signal, a reset input and an output set upon receipt of a write request signal, a not-empty-signal set-reset flip flop having a set input, a reset input receiving said second domain read request signal and an output reset upon receipt of a read request signal, an inverter having an input connected to said output of said not empty set-reset flip flop and an output, a first asynchronous edge detector having an input connected to said output of said inverter, a clock input receiving said first clock signal, a clear input and an output generating an edge detection signal indicating said input has made a predetermined logic state transition, a first synchronous logic block having an input connected to said output of said first asynchronous edge detector, a clock input receiving said first clock signal, a clear input and an output connected to said clear input, said reset input of said full-signal set-rest flip flop, said clear input of said first asynchronous edge detector, said output generating a signal synchronous with said first clock signal upon detection of an input from said first asynchronous edge detector, a second asynchronous edge detector having an input connected to said output of said full-signal set-reset flip flop, a clock input receiving said second clock signal, a clear input and an output generating an edge detection signal indicating said input has made a predetermined logic state transition, a second synchronous logic block having an input connected to said output of said second asynchronous edge detector, a clock input receiving said second clock signal, a clear input and an output connected to said clear input, said set input of said not-empty-signal set-rest flip flop, said clear input of said second asynchronous edge detector, said output generating a signal synchronous with said first clock signal upon detection of an input from said first asynchronous edge detector.

4. The data transfer apparatus of claim 3, wherein:

each of said first and second asynchronous edge detectors includes a first D flip-flop having an inverse set input connected to said input of said asynchronous edge detector, a clock input receiving said corresponding clock signal, a D input and an output, a NAND gate having a first input connected to said input of said asynchronous edge detector, a second input connected to said output of said first D flip-flop, a third input and an output;

a second D flip-flop having an inverse set input connected to said output of said NAND gate, a clock input receiving said corresponding clock signal, a D input and an output connected to said output of said asynchronous edge detector, and an inverter having an input connected to said output of said second D flip-flop and an output connected to said D input of said first D flip-flop, said third input of said NAND gate and said D input of said second D flip-flop.

5. The data transfer apparatus of claim 3, wherein: each of said first and second synchronous logic blocks includes a first NAND gate having a noninverting input connected to said input of said synchronous logic block, an inverting input and an output;

a first D flip-flop having a clock input receiving said corresponding clock signal, a D input connected to said output of said first NAND gate and an output, a second NAND gate having a noninverting input connected to said output of said first D flip-flop, an inverting input and an output; and a second D flip-flop having a clock input receiving said corresponding clock signal, a D input connected to said output of said second NAND gate and an output connected to said inverting input of said first NAND gate, said inverting input of said second NAND gate and said output of said synchronous logic block.

\* \* \* \* \*